United States Patent [19]

Skingle

[11] 4,050,840
[45] Sept. 27, 1977

[54] RADIALLY ADJUSTABLE ROTARY CUTTING TOOL

[75] Inventor: Thomas Jerome Skingle, Parma, Ohio

[73] Assignee: Acme-Cleveland Corporation, Cleveland, Ohio

[21] Appl. No.: 564,065

[22] Filed: Apr. 1, 1975

[51] Int. Cl.² ..................... B23B 27/14; B23B 51/00
[52] U.S. Cl. ..................................... 408/144; 407/32; 407/53; 408/161
[58] Field of Search ............. 408/144, 161, 229, 713; 76/101 A; 29/103 A

[56] References Cited

U.S. PATENT DOCUMENTS

| | | | |
|---|---|---|---|
| 764,145 | 7/1904 | McKenna | 76/101 A |
| 945,566 | 1/1910 | Matthews | 408/144 |
| 2,858,718 | 11/1958 | Kohler | 408/144 |
| 3,017,790 | 1/1962 | Werle | 408/144 |

Primary Examiner—Othell M. Simpson
Assistant Examiner—Z. R. Bilinsky
Attorney, Agent, or Firm—Bosworth, Sessions & McCoy

[57] ABSTRACT

A radially adjustable rotary cutting tool such as a rotary reamer or the like. The tool head has a generally cylindrical body with a shank at one end and a radially slotted cutting head at the other end. The cutting head has a central axially extending threaded bore adapted to receive a threaded expansion element that may be used to radially expand or enlarge the cutting head when turned into the bore. The cutting head has an inner core portion formed of a low to medium alloy carbon steel and an annular outer portion formed of a tool steel metallurgically bonded to the core portion to provide a unitary composite structure. The annular outer portion has a plurality of circumferentially spaced longitudinal flutes formed therein to define integral longitudinally extending radially adjustable cutting surfaces.

4 Claims, 10 Drawing Figures

RADIALLY ADJUSTABLE ROTARY CUTTING TOOL

BACKGROUND OF THE INVENTION

This invention relates to rotary cutting tools such as reamers or the like and especially to an improved tool head construction wherein the head is formed from a single piece of specially prepared cylindrical bar stock having a composite metallurgical structure. More particularly, the invention relates to an improved means for fabricating a radially adjustable tool head such as an expansion reamer, for example, to eliminate the separate steps of machining seats for tool steel cutting elements or blades and then anchoring the tool steel blades to the machined body formed of low to medium alloy carbon steel. The invention has particular utility in connection with the fabrication of expansion reamers of the type that are provided with a threaded pin that is turned into a threaded axial bore in the body to force the blades radially outward.

Expansion reamers are normally provided with axially extending radial slots so as to permit radial expansion of the tool head when an adjusting pin is turned into a threaded axial bore in the head. The expandability of the tool makes possible the maintenance of a predetermined outside diameter while permitting necessary grinding of the outside diameter. The expansion capability is used to compensate for wear etc. and permits minor adjustment to maintain tolerances.

Rotary cutting tools such as expansion reamers and the like are conventionally formed of a generally cylindrical body of low to medium alloy carbon steel having axially extending seats machined therein to receive tool steel cutting elements or blades. The blades are usually brazed, silver soldered or welded to the body. When the blades are brazed to the body, heat from brazing excessively softens the tool steel blades because of overtempering or insufficient hardening. When blades are soldered in place, the resulting tool has a low thermal resistance and when they are welded, the resulting interface between the blades and the low carbon steel body, is brittle and vulnerable to damage from shock and vibration.

Known rotary cutting tools such as expansion reamers described above may also be provided with inserted wear resistant carbide or ceramic tips in order to increase tool life and cutting capabilities, for example. Such a carbide tipped tool results in a multi-component assembly comprising a low to medium alloy carbon steel body, tool steel blades and carbide tips. The assembly involves machining seats or slots for both the blades and the tips, and brazing or otherwise bonding all of them to the body.

Although the properties of carbide or ceramic which make them desirable in cutting tools are not adversely influenced by the heat required for brazing or bonding them to the steel body, the addition of more and diverse elements adds significantly to the manufacturing costs of this form of rotary cutting tools.

The tool of the present invention reduces, if not eliminates the disadvantages and shortcomings discussed above of known forms of rotary cutting tools and affords other features and advantages heretofore not obtainable.

SUMMARY OF THE INVENTION

It is among the objects of the invention to eliminate the need for providing, fitting and anchoring of separate tool steel inserts or blades in radially adjustable rotary cutting tools.

Another object of the invention is to manufacture radially adjustable rotary cutting tool heads having tool steel cutting surfaces from a single piece of cylindrical stock.

A further object is to minimize upon radial expansion the occurrence of tensile stresses on machined surfaces of notch sensitive tool steel. Tensile stresses are confined to machined surfaces on low to medium alloy carbon steel.

Still another object is to provide a ceramic or carbide tipped rotary cutting tool requiring significantly fewer parts and increased ease of manufacture compared with conventional forms of such tools.

These and other advantages are achieved with the unique construction of the invention. According to the invention, a rotary cutting tool is formed with a cutting head at one end and a shank at the other end, the cutting head having an axial bore, threaded throughout a portion of its lengths and a plurality of longitudinally extending radial slots extending outwardly from the bore to permit radial expansion of the head. An expansion element such as a threaded pin is turned and drawn into the bore and adapted thereby to radially expand the cutting head.

In accordance with the invention, the cutting head comprises an inner core portion formed of a low to medium alloy carbon steel and an annular outer portion metallurgically bonded to the core portion and formed of a tool steel alloy. The annular outer portion has a plurality of circumferentially spaced longitudinal flutes formed therein to define therebetween, integral, longitudinally extending radially adjustable cutting surfaces. Slots for ceramic or carbide tips, if desired, are machined in the annular outer portion of the head.

DESCRIPTION OF THE PREFERRED EMBODIMENT

For the purpose of illustration, the invention is shown and described herein with reference to an expansion reamer, however, it will be understood that the invention may also be used in connection with counterbores and other adjustable rotary tool heads.

Figure 1:
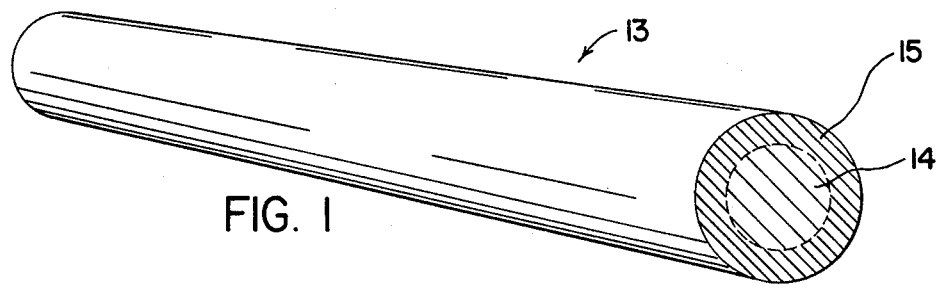
FIG. 1 is a perspective view of a length of composite metallurgical stock specially prepared for use in fabricating tools embodying the invention.
Figure 2:
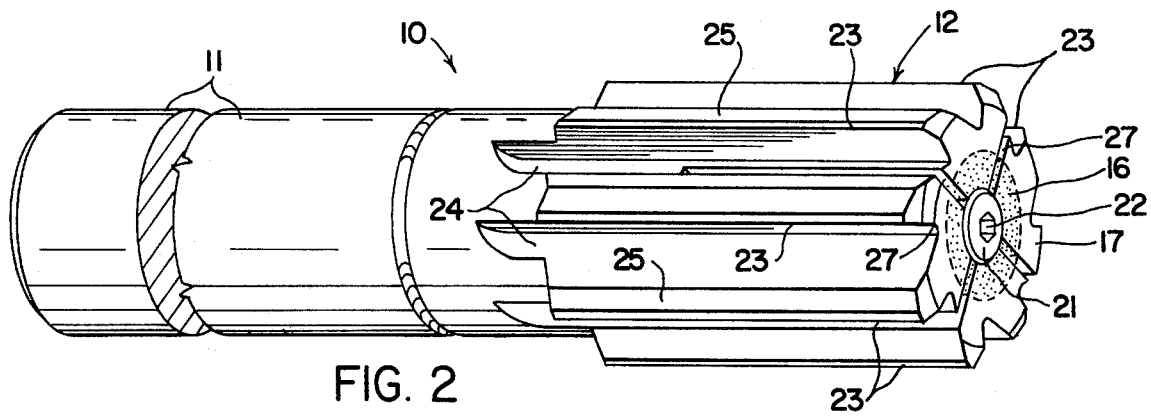
FIG. 2 is a perspective view illustrating a radially adjustable reamer embodying the invention.

FIGS. 2 through 5 show an expansion reamer 10 having a shank portion 11 welded at one end to an end of a cutting head 12. The cutting head 12 is a unitary element formed from a length of specially prepared cylindrical composite metallurgical bar stock such as the length 13 illustrated in FIG. 1. The bar stock 13 has a central core portion 14 comprising a low to medium alloy carbon steel and an annular outer portion 15 formed of tool steel. Bar stock of this composite character has a metallurgical bond of absolute soundness between the two components and is obtainable, for example, from Colt Industries, Crucible, Inc.

Figure 3:
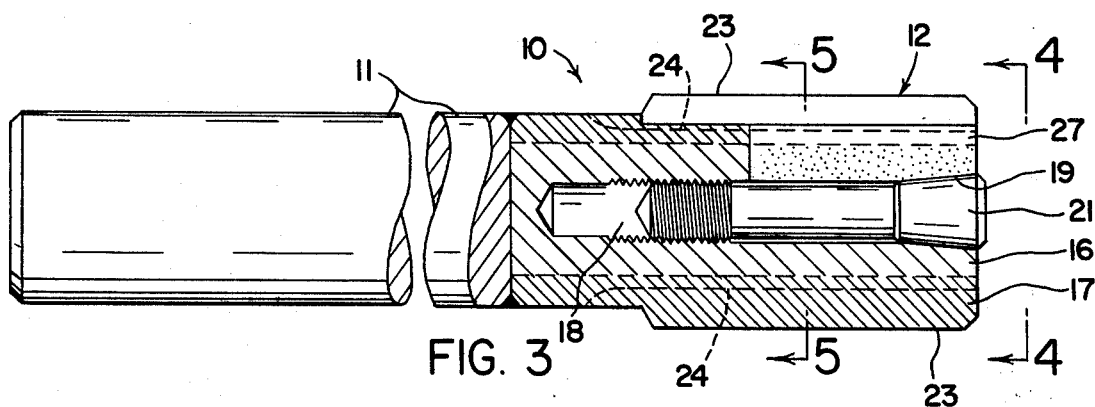
FIG. 3 is an elevational view of the radially adjustable reamer of FIG. 2 with parts broken away and shown in a section taken on the line 3—3 of FIG. 4.

It will be seen that the cutting head 12 fabricated from the bar stock 13 has a composite metallurgical character comprises a low to medium alloy carbon steel core 16 and a tool steel outer portion 17. As seen in FIG. 3, and axial bore 18 is formed in the core 16 and extends the greater part of the axial length of the cutting head 12. The bore 18 has a conically tapered outer end portion 19 adapted to cooperate with a conically shaped head portion on one end of threaded expansion pin 21. Expansion pin 21 is turned into the thread portion of bore 18. Turning the pin 21 into bore 18 draws the enlarged head into end portion 19 of the bore tending to expand the cutting head 12 in a radial direction. The head of expansion pin 21 is provided with a hexagonal socket 22 so that it may be turned with a conventional hex wrench.

The cutting head 12 of the preferred embodiment shown is provided with eight axially extending radial cutting surfaces 23 comprising the forward faces of eight lands that are integral with the body of the cutting head 12. Surfaces 23 and their associated lands are spaced circumferentially around cutting head 12 between flutes 24 generated in the tool steel outer portion 17 of the cutting head 12. The lands shown in FIGS. 4 and 5 in particular are relieved on surfaces 25 which together with cutting surfaces 23 join to form a cutting edge. This invention is not limited to tools having eight flutes, lands and associated cutting surfaces. For example, the invention may be embodied in tools with greater or fewer even numbers of flutes and cutting surfaces.

Figure 4:
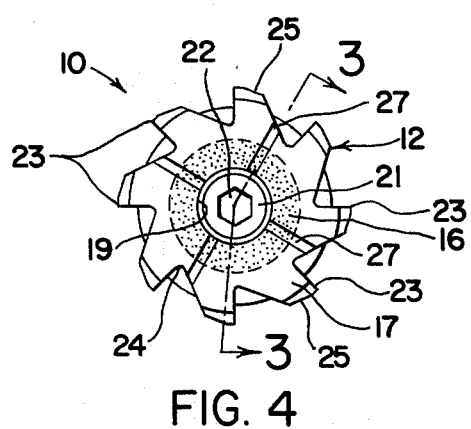
FIG. 4 is an end elevation taken from the line 4—4 of FIG. 3.
Figure 5:
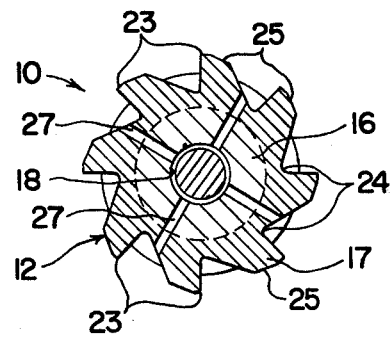
FIG. 5 is a transverse cross sectional view taken on the line 5—5 of FIG. 3.
Figure 6:
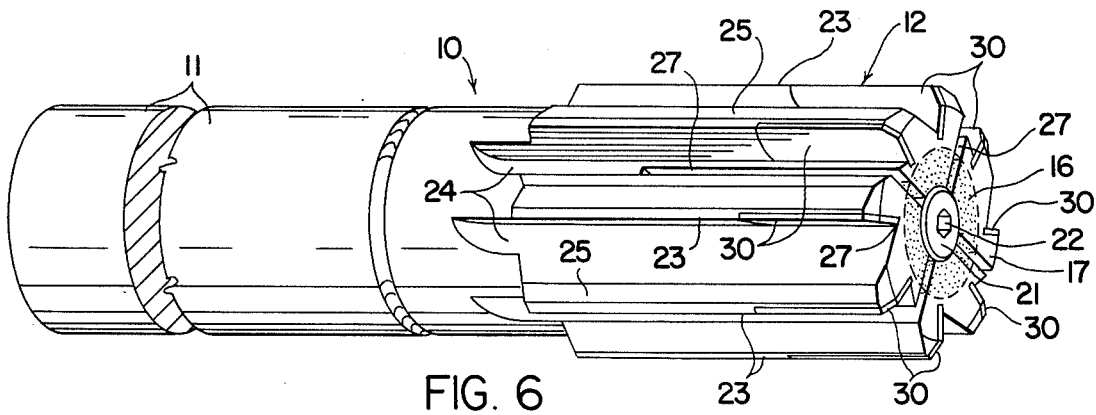
FIG. 6 is a perspective view illustrating a radially adjustable reamer embodying another form of the invention.
Figure 7:
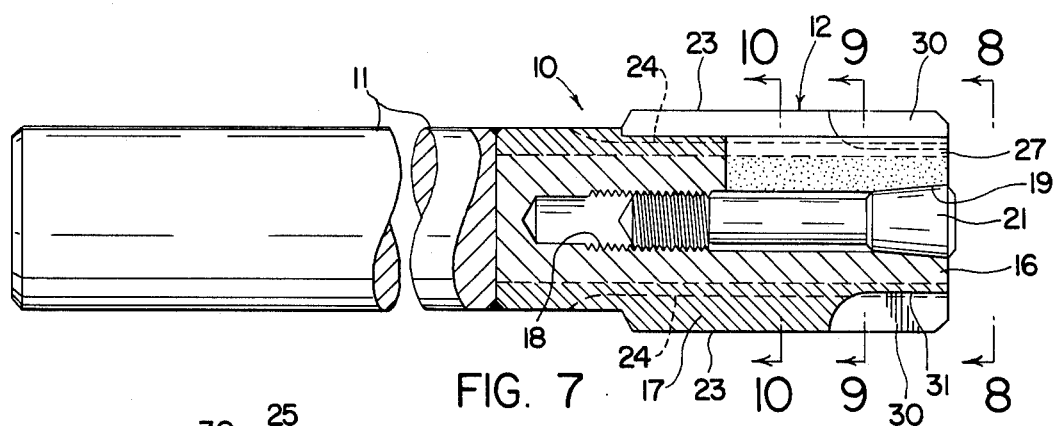
FIG. 7 is an elevational view of the radially adjustable reamer of FIG. 6 with parts broken away and shown in section taken on the line 7—7 in FIG. 8.
Figure 8:
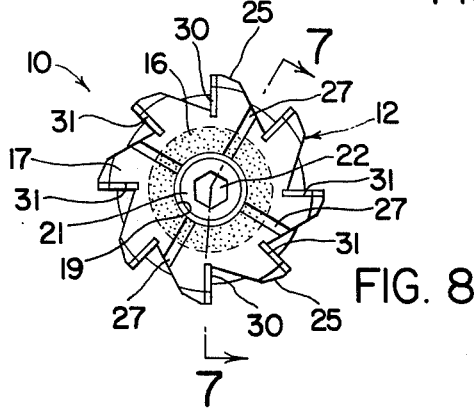
FIG. 8 is an end elevation taken from the line 8—8 of FIG. 7.
Figure 10:
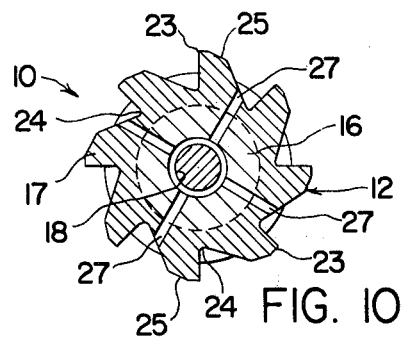
FIG. 10 is a transverse cross sectional view taken on the line 10—10 of FIG. 7.
Figure 9:
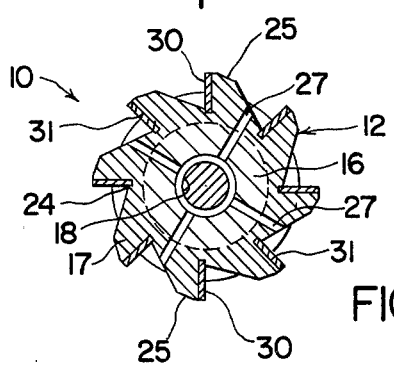
FIG. 9 is a transverse cross sectional view taken on the line 9—9 of FIG. 7.

In order to permit radial expansion of reamer 10 shown in the drawings, four axially extending radial slots 27 are cut through the forward portion of the cutting head 12 as best illustrated in FIGS. 3, 4 and 5. The radial slots 27 are uniformly spaced at 90° apart around the circumference of the cutting head 12 and serve to separate the cutting head into four segments. Thus, when the expansion pin 21 is drawn into bore 18, its tapered head 20 forces the segments radially outward so the cutting surfaces 23 will ream to a larger diameter. The number of radial expansion slots in any given tool is preferably half the even number total of flutes and cutting surfaces.

As shown in the preferred embodiment in FIG. 3, the radial expansion slots 27 preferably intersect only the untapped and smooth walled portion of bore 18. The tapped portion of bore 18 lies axially deeper in the length of head portion 12 beyond the axial bottoms of slots 27. In this way, greater tension stresses produced by expansion of the head can be tolerated in the material at and next to the bore wall when the head is expanded.

The unique tool head construction of the invention eliminates brazing and welding heats and permits heat treatment of the tool at a temperature that is more compatible with proper austenitizing and tempering levels of the tool steel to provide an improved tool quality. The results are considerably better than achieved where separate blades must be brazed or otherwise anchored in machined seats in the body of the tool head.

Preferably, the internal machined surfaces of the tool are only in the low to medium alloy carbon steel core 16 and spaced radially inwardly from the tool steel outer portion 17. Thus, upon expansion, core 16 of low carbon steel, for example, will carry the tension stresses and the notch sensitive tool steel of the outer portion 17 will preferably extend radially no deeper than the neutral axis of the stressed and expanded portions or segments of the tool head and thus will lie on the compression side of the neutral axis.

It will be noted that an expansion tool embodying the invention has greater torsional rigidity than conventional tools employing inserted blades because of the discontinuous outer ring of tool steel. The enhanced rigidity results in increased machined hole quality and also increased tool life. The invention also permits heat treatment of the tool that is compatible with its tool steel cutting portion rather than treatment compatible with a process for joining inserts to the tool body. The increased tool rigidity in combination with the enhanced metallurgical quality results in an adjustable tool that has a performance and produces a hole finish of comparable quality to that obtainable with a solid tool.

The invention described above also may be utilized to advantage in radially adjustable rotary cutting tools having inserted tips of hard material (e.g., tungsten carbide or ceramic). Carbide tipped cutting tools using the same composite metallurgical material eliminates the need for forming, fitting and anchoring of tool steel back-up blades in the cutting faces of conventional tipped cutting tools.

Such a form of the invention is embodied in the cutting tool shown in FIGS. 6 through 10. This form is shown embodied in the same expansion reamer as is the preferred form. The modified form differs from the preferred form by the addition thereto of inserts of tungsten carbide, for example, in the forward (right as viewed in FIGS. 6 and 7) ends of the cutting surfaces. In the drawings showing the modified form, FIGS. 6 through 10, elements thereof corresponding to like elements of the preferred form have been given the same reference numerals.

The modified form of the invention, except for carbide or ceramic insets, is structurally the same as the preferred form. In particular, the cutting head 12 of the reamer is formed of composite metallurgical bar stock having a central core portion 14 of low to medium alloy carbon steel and an annular outer portion 15 of tool steel, as described above. The inserts 30, of carbide for example, as fastened to annular outer portion 15 by any suitable means such as brazing in pockets or tip slots 31 milled into the forward ends of cutting surfaces 23. Inserts 30 preferably fit flush with cutting surfaces 23 and both the chamfered and axially extending cutting edges of the surfaces.

In use, carbide inserts 30 act as primary cutting surfaces and annular outer portion 15 of head portion 12 acts as both a guide to the cutting surfaces and as support backing. In conventional carbide tipped cutting tools such as expansion reamers, pockets must be machined in the cutting surfaces to receive both inserted back-up blades of tool steel and carbide or ceramic tips.

The carbide tipped form of the invention is an extension of the preferred embodiment described above, using its advantages to provide a more easily and conveniently formed tipped tool. For example, the number of inserted elements normally required in conventional carbide tipped construction is cut in half. In addition substantial machining time and cost is saved.

The disadvantages of conventional tool design are overcome in spite of the need for brazing the carbide inserts into their slots because the desirable properties of carbide and ceramic are not adversely effected by the heat required for quality brazing or bonding. Also, the tool steel material in carbide tipped adjustable reamers, for example, of both the conventional and the invention embodying designs functions as a wear or bearing surface in conjunction with carbide cutting tips rather than as a cutting surface so that any reduced tool steel hardness resulting from brazing or bonding heat is not detrimental. Consequently, the cutting qualities of the tool are not reduced by bonding temperatures employed.

While the invention has been illustrated and described with respect to preferred and modified embodiments thereof, this is intended for the purpose of illustration rather than limitation and other modifications and variations in the specific forms herein shown and described will be apparent to those skilled in the art all within the intended spirit and scope of the invention. Accordingly, the patent is not to be limited in scope and effect to the specific forms herein shown and described nor in any other way that is inconsistent with the extent to which the progress in the art has been advanced by the invention.

I claim:

1. In a rotary cutting tool with a cutting head having a generally cylindrical body with a threaded axial bore and a plurality of longitudinally extending radial slots extending through to the bore to accommodate radial expansion of the cutting head, and an expansion element threaded into said bore and adapted when turned into said bore to radially expand the cutting head, the improvement wherein said cutting head comprises an inner core portion consisting of low to medium alloy carbon steel and an annular outer portion consisting of a tool steel and metallurgically bonded to said core portion at an annular interface region, said annular outer portion being shaped to define a plurality of integral, circumferentially shaped longitudinally extending cutting surfaces.

2. A cutting tool as defined in claim 1 wherein said annular outer portion lies substantially radially on the compression side of the neutral axis of the stressed and expanded portion of the tool head.

3. A cutting tool as defined in claim 2 wherein said cutting surfaces of said improvement include pockets in said annular outer portion for receiving inserts of hard material, together with hard material inserts bonded to said annular outer portion in said pockets to form hard cutting surfaces.

4. A cutting tool as defined in claim 3 wherein said hard material is carbide or ceramic.

* * * * *